(12) United States Patent
Lee et al.

(10) Patent No.: US 7,565,184 B2
(45) Date of Patent: Jul. 21, 2009

(54) MOBILE COMMUNICATION TERMINAL

(75) Inventors: Seong-Cheol Lee, Seoul (KR);
Yong-Hum Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 11/439,704

(22) Filed: May 23, 2006

(65) Prior Publication Data

US 2006/0270459 A1      Nov. 30, 2006

(30) Foreign Application Priority Data

May 24, 2005   (KR)   ................ 10-2005-0043860
May 24, 2005   (KR)   ................ 10-2005-0043861

(51) Int. Cl.
*H04B 1/08*   (2006.01)
*H04M 1/00*   (2006.01)

(52) U.S. Cl. ............... 455/575.1; 455/350; 455/575.4; 379/433.02; 379/433.12

(58) Field of Classification Search ............... 455/90.3, 455/347, 350, 566, 569.1, 575.1, 575.4; 379/433.02, 379/433.12
See application file for complete search history.

(56) References Cited

U.S. PATENT DOCUMENTS 6,321,070 B1   11/2001   Clark et al.
7,092,745 B1 *  8/2006   D'Souza ............... 455/575.1
7,106,878 B2 *  9/2006   Saiki et al. ............ 381/396
7,233,678 B2 *  6/2007   Erixon et al. .......... 381/345
2003/0096632 A1 *  5/2003   Kim et al. .............. 455/550
2005/0119034 A1 *  6/2005   Kato et al. ............. 455/575.4

FOREIGN PATENT DOCUMENTS

| CN | 1551602 | 12/2004 |
|---|---|---|
| EP | 2002051130 | 2/2002 |
| EP | 1 478 206 A2 | 11/2004 |
| GB | 2 386 281 A | 9/2003 |
| JP | 2000078254 | 3/2000 |
| JP | 2003-319036 | 11/2003 |
| JP | 2003-319038 | 11/2003 |
| JP | 2004180223 | 6/2004 |
| JP | 2005117201 | 4/2005 |
| KR | 10-2004-0105906 A | 10/2003 |
| KR | 10-2005-0029819 A | 3/2005 |

* cited by examiner

*Primary Examiner*—Simon D Nguyen
(74) *Attorney, Agent, or Firm*—Lee, Hong, Degerman, Kang & Waimey

(57) ABSTRACT

A mobile communication terminal is provided with a speaker having a size suitable for music appreciation and is implemented without widening the mobile communication terminal or decreasing an area of a display. Furthermore, mixture between sound emitted toward a front side of the speaker and sound emitted toward a rear side of the speaker is prevented as is leakage of sound from the body of the mobile communication terminal.

28 Claims, 5 Drawing Sheets

MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 10-2005-0043860, filed on May 24, 2005 and Korean Application No. 10-2005-0043861, filed on May 24, 2005, the contents of which are hereby incorporated by reference herein in their entirety.

BACKGROUND OF THE INVENTION

1. Field of the Invention

The present invention relates to a mobile communication terminal, and more particularly, to a mobile communication terminal capable of improving sound pressure and sound quality and preventing sound leakage and an increase of a terminal's thickness due to the speaker.

2. Description of the Related Art

A mobile communication terminal, such as a mobile phone or a personal digital assistant (PDA), is an electronic device for performing wireless transmission or wireless reception while being carried by a user. Recently, as information communication techniques and memory techniques have developed, mobile communication terminals have incorporated functions for transceiving multimedia.

For example, functions for replaying moving image files such as a video on demand (VOD), for replaying music files and functions for receiving television broadcasts using a satellite communication have been provided. As multimedia functions are provided in mobile communication terminals, a speaker mounted in the mobile communication terminal must provide better sound quality and power rather than merely transmitting a communication reception sound or an alarm sound.

Furthermore, small and slim mobile communication terminals have been developed for a user's convenience. Toward this end, small components having a high degree of integration are used in mobile communication terminals and the components are arranged such that unnecessary space is reduced. A dynamic speaker, which is one of the most popular speakers integrated into conventional mobile communication terminals has a size of at least 10 mm(L)×10 mm(W)×3.6 mm(T) in order to provide the sound quality or sound pressure necessary for replaying a music file, such as an MP3 file or an MC file.

However, when a large dynamic speaker is mounted in a mobile communication terminal, the available space for mounting other components is greatly decreased. Since display units for displaying various information are being widened, arranging the speaker adjacent to the display unit in a mobile communication terminal causes an increase in size of a mobile communication terminal or requires unnecessary mounting space.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

One object of the present invention is to provide a mobile communication terminal having a speaker that provides better sound quality and sound pressure suitable for music appreciation. Another object of the present invention is to provide a mobile communication terminal having a speaker capable of preventing sound radiated toward a front side and a rear side of the speaker from canceling each other. Still another object of the present invention is to provide a mobile communication terminal having a speaker capable of preventing an increase in thickness of the terminal due to the speaker.

In one aspect of the invention, a mobile communication terminal is provided. The mobile communication terminal includes a terminal body having a speaker hole, a display installed in the terminal body and a speaker installed at a rear surface of the display such that a portion of the speaker is exposed to the speaker hole, wherein sound emitted toward a front side of the speaker and sound emitted toward a rear side of the speaker are prevented from mixing.

It is contemplated that the speaker is a disk-type speaker. It is further contemplated that the mobile communication terminal further includes a speaker rib formed between an inner surface of the terminal body and the exposed portion of the speaker and adapted to support the speaker.

It is contemplated that the speaker rib is formed as an arc shape to surround a peripheral portion of the speaker hole. It is further contemplated that the speaker rib is in contact with a display guard rib adapted to protect the display.

It is contemplated that a front surface of the speaker is fixed to a rear surface of the speaker rib and a rear surface of the display. It is further contemplated that the speaker is a piezo-electricity speaker.

In another aspect of the invention, a mobile communication terminal is provided. The mobile communication terminal includes a terminal body having a speaker hole, a display installed in the terminal body, a speaker installed at a rear surface of the display such that a portion of the speaker is exposed to the speaker hole and a sound leak preventing unit installed at a front surface of the speaker and adapted to prevent sound emitted from the speaker from leaking from the terminal body.

It is contemplated that the speaker is a disk-type speaker. It is further contemplated that the speaker is a piezoelectricity speaker.

It is contemplated that the mobile communication terminal further includes a speaker rib formed between an inner surface of the terminal body and the exposed portion of the speaker and adapted to support the speaker. It is further contemplated that the sound leak preventing unit includes a speaker rib formed between an inner surface of the terminal body and the portion of the speaker exposed to the speaker hole and a sound insulator installed between the front surface of the speaker and the speaker rib and display.

It is contemplated that the speaker rib is formed as an arc shape to surround a peripheral portion of the speaker hole. It is further contemplated that the speaker rib is in contact with a display guard rib adapted to protect the display.

It is contemplated that the sound insulator includes a first sound insulator having a band shape of a certain width along an end of the speaker rib and disposed between the speaker rib and the speaker and a second sound insulator disposed at an overlapped region between the display and the speaker. It is further contemplated that the second sound insulator is formed as a plate.

It is contemplated that a gap between the first sound insulator and the second sound insulator is less than or equal to a gap between the display and a display guard rib adapted to protect the display. It is further contemplated that a front surface of the speaker is fixed to a rear surface of the speaker rib and a rear surface of the display.

In another aspect of the invention, a mobile communication terminal is provided. The mobile communication terminal includes a first body having a speaker hole at one side, a display installed in the front body adjacent the speaker hole, a second body slidably coupled to the first body, a slide module disposed between the first body and the second body and adapted to guide the first body relative to the second body and a speaker installed at a rear surface of the display in the slide module and having a portion exposed to the speaker hole, wherein sound emitted toward a front side of the speaker and sound emitted toward a rear side of the speaker are prevented from mixing.

It is contemplated that the slide module includes a first slide member fixed to a lower surface of the first body, a second slide member fixed to an upper surface of the second body and a connection member adapted to slidably connect the first slide member to the second slide member. It is further contemplated that the first slide member has an insertion hole and the speaker is mounted in the insertion hole.

It is contemplated that the speaker is a disk type speaker. It is further contemplated that the speaker is a piezoelectricity speaker.

It is contemplated that the mobile communication terminal further includes a speaker rib and formed between an inner surface of the terminal body and the exposed portion of the speaker and adapted to support the speaker. It is further contemplated that the mobile communication terminal further includes a sound leak preventing unit installed at a front surface of the speaker and adapted to prevent sound emitted from the speaker from leaking from the first body.

It is contemplated that the sound leak preventing unit includes a speaker rib formed between an inner surface of the terminal body and the portion of the speaker exposed to the speaker hole and a sound insulator installed between a front surface of the speaker and the speaker rib and display. It is further contemplated that the speaker rib is formed as an arc shape to surround a peripheral portion of the speaker hole.

It is contemplated that the speaker rib is in contact with a display guard rib adapted to protect the display. It is further contemplated that the sound insulator includes a first sound insulator having a band shape of a certain width along an end of the speaker rib and disposed between the speaker rib and the speaker and a second sound insulator disposed at an overlapped region between the display and the speaker.

It is contemplated that the second sound insulator is formed as a plate. It is further contemplated that a gap between the first sound insulator and the second sound insulator is less than or equal to a gap between the display and a display guard rib adapted to protect the display. Preferably, a front surface of the speaker is fixed to a rear surface of the speaker rib and a rear surface of the display.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention is directed to a mobile communication terminal capable of improving sound pressure and sound quality and preventing sound leakage and an increase of a terminal's thickness due to the speaker. Reference will now be made in detail to the preferred embodiments of the present invention, examples of which are illustrated in the accompanying drawings. Although a preferred embodiment of a mobile communication terminal according to the present invention is explained with reference to a slide-type mobile communication terminal, the present invention may be applied to other types of mobile communication terminals, such as a bar-type, a folder-type or a rotate-type.

Figure 1:
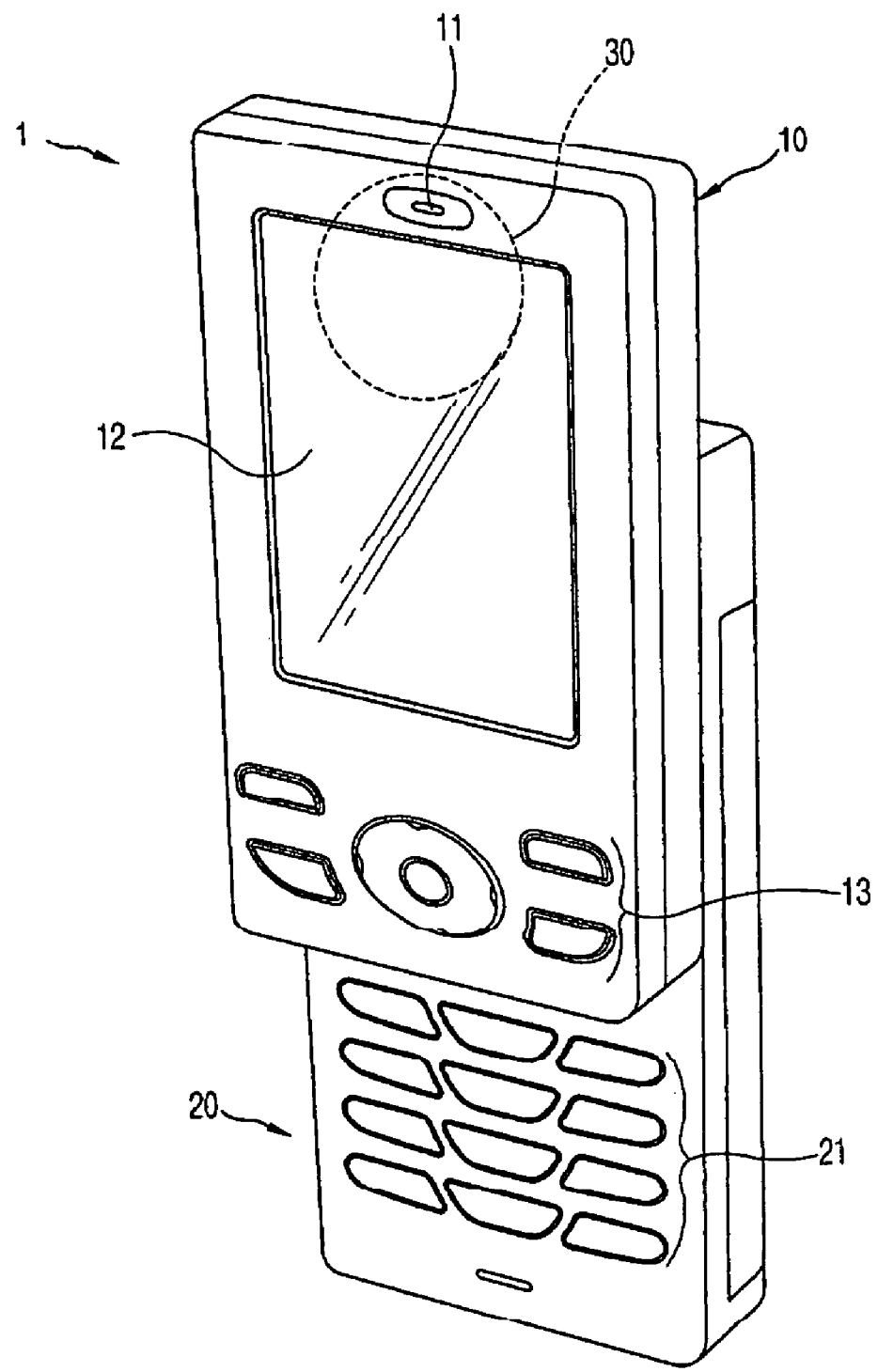
FIG. 1 is a perspective view showing a mobile communication terminal according to the present invention.

FIG. 1 is a perspective view of a mobile communication terminal according to the present invention. As illustrated, the mobile communication terminal includes a first body 10 having a speaker hole 11 through which sound is emitted outwardly at one side, a display 12 at a lower portion of the speaker hole for displaying information and a second body slidably connected to the first body.

A first key pad 13 having a plurality of key buttons for inputting information is installed on the first body 10 at a lower side of the display 12. A second key pad 21 having a plurality of key buttons mounted at a portion over which the first body 10 is opened or closed is installed on the second body 20.

Figure 2:
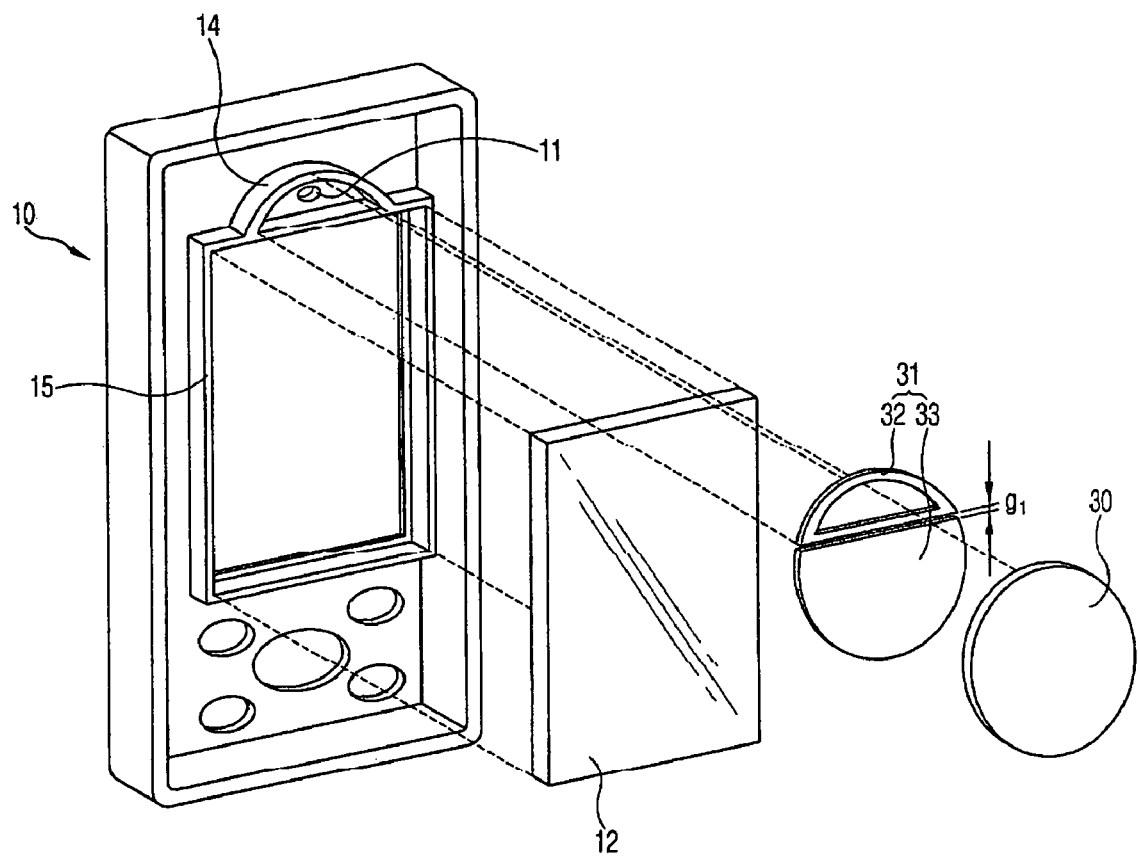
FIG. 2 is a disassembled rear perspective view showing a speaker mounted in a first body of a mobile communication terminal according to one embodiment of the present invention.
Figure 3:
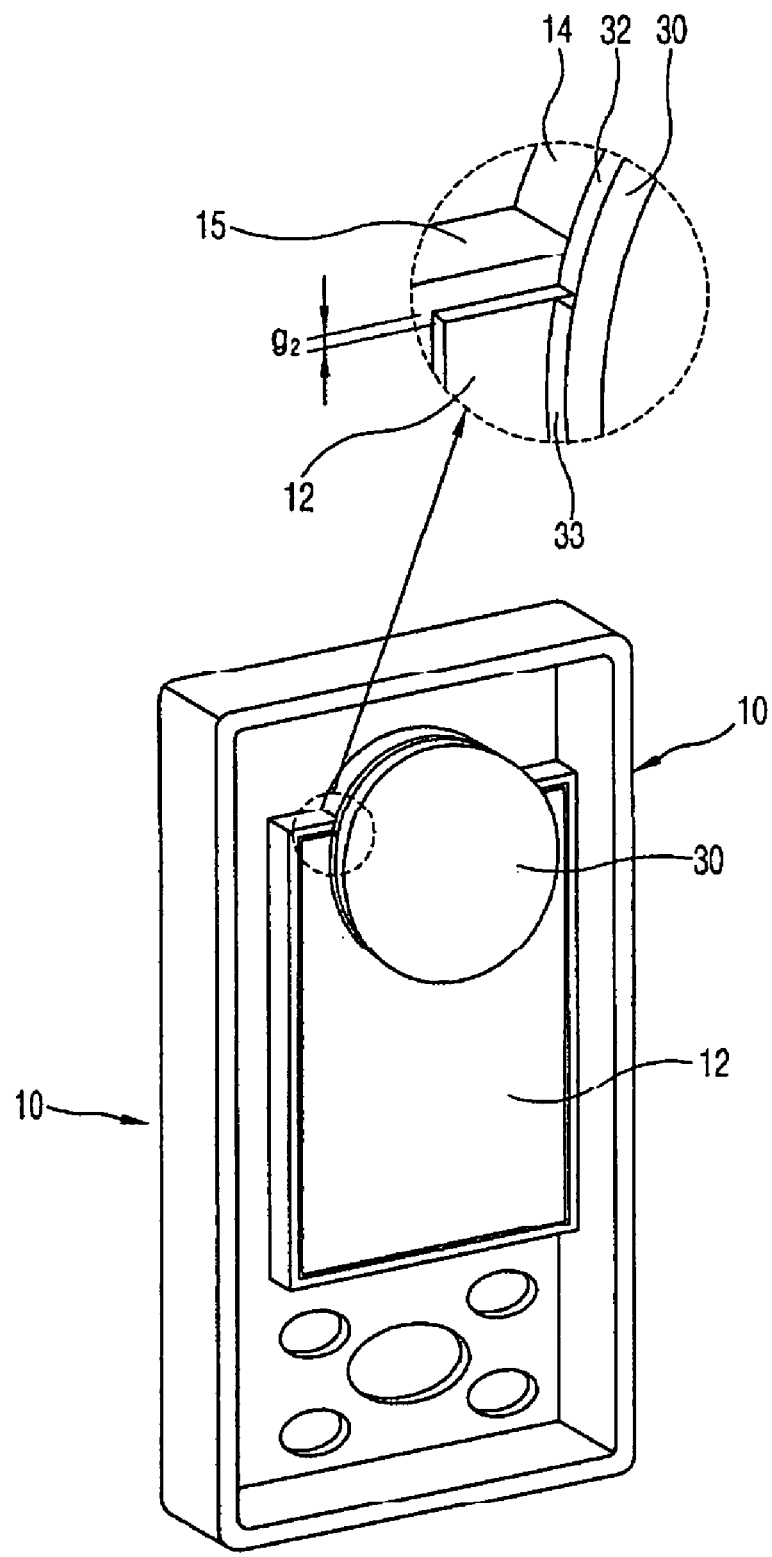
FIG. 3 is an assembled perspective view of the speaker of FIG. 2.

FIG. 2 is a disassembled perspective view showing a speaker 30 mounted in the first body 10, as viewed from a rear side. FIG. 3 is an assembled perspective view of the speaker 30 of FIG. 2. As illustrated in FIGS. 2 and 3, the speaker 30 is installed in the first body 10.

Specifically, the speaker 30 is installed at a rear surface of the display 12 of the first body 10 and is positioned so that one portion of the speaker is exposed to the speaker hole 11. As illustrated, the speaker 30 is constructed as a disk having a large diameter to increase sound pressure and power. A ceramic material having decreased consumption power and a small thickness can be used as the speaker 30 or a piezoelectricity material can be used.

As illustrated in FIG. 2, a sound leak preventing unit for preventing leakage of sound emitted from the speaker 30 is installed at an inner surface of the first body 10 in front of the speaker 30. The sound leak preventing unit includes a speaker rib 14 formed between an inner surface of the first body 10 and the exposed portion of the speaker 30 and a sound insulator device 31 installed between the front surface of the speaker and the speaker rib 14 and the display 12.

The speaker rib 14 is formed as an arc shape to surround a peripheral portion of the speaker hole 11 in order to prevent sound from leaking toward the side direction. An end of the speaker rib 14 is in contact with the exposed portion of the speaker 30 along a circumferential direction and supports the speaker.

The speaker rib 14 is also in contact with a display guard rib 15 for protecting the display 12 in order to ensure a maximum exposed area of the speaker 30 towards the speaker hole 11. A front surface of the speaker 30 is fixed to a rear surface of the speaker rib 14 and the display 12 by adhesion.

The sound insulator device 31 includes a first sound insulator 32 fixed to a front upper portion of the speaker 30 and a second sound insulator 33 fixed to a front lower portion of the speaker 30. The first sound insulator 32 has a band shape of a certain width along the end of the speaker rib 14 and is installed between the speaker rib 14 and the speaker 30. The second sound insulator 33 is installed at an overlapped space between the display 12 and the speaker 30.

The second sound insulator 33 is formed as a plate in order to completely shield sound emitted from a region of the speaker 30 that is not directly over the speaker hole 11, or the overlapped portion between the second sound insulator 33 and the display 12, from being mixed with sound emitted toward a rear side of the speaker. Preferably, a gap (g1) is formed between the first sound insulator 32 and the second sound insulator 33 and the gap is equal to or less than a gap (g2) of approximately 0.15 mm between a peripheral portion of the display 12 and the display guard rib 15 in order to minimize sound emitted between the first sound insulator and the second sound insulator.

The sound insulator 31 device is formed of a material intended to seal a gap between the speaker rib 14 and the speaker 30 or between the display 12 and the speaker 30 in order to prevent sound leakage. For example, a foamy plastic material or a porous plastic material may be used.

Figure 4:
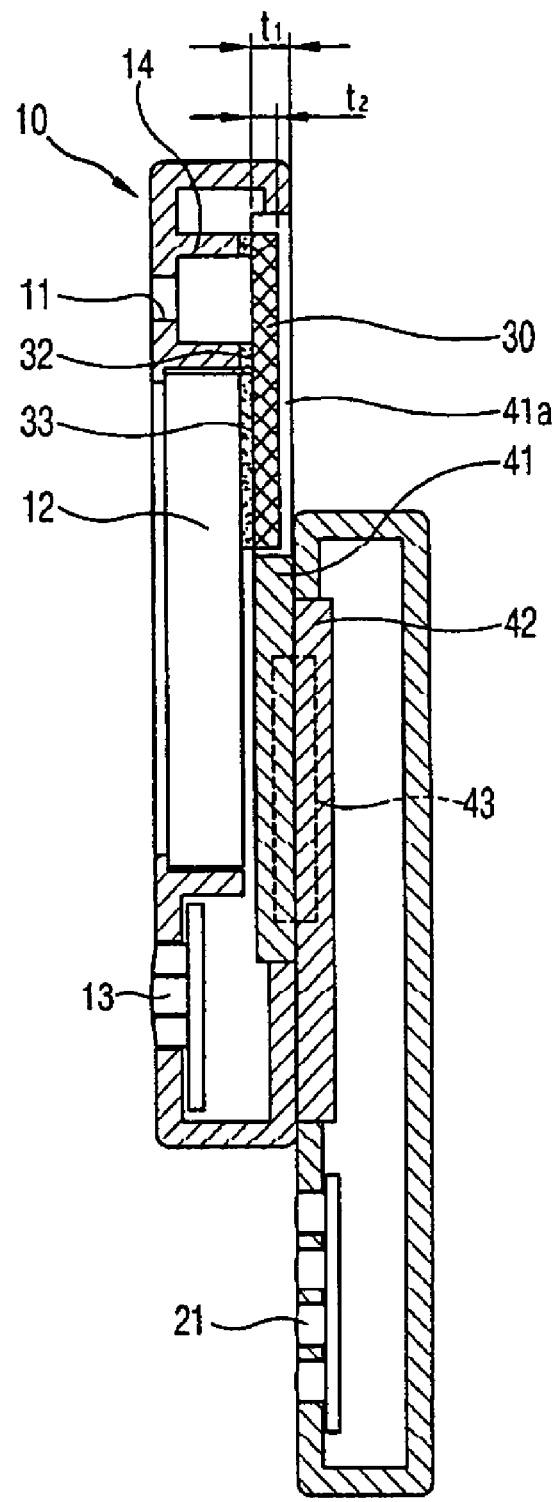
FIG. 4 is a side section view of the mobile communication terminal of FIG. 1.
Figure 5:
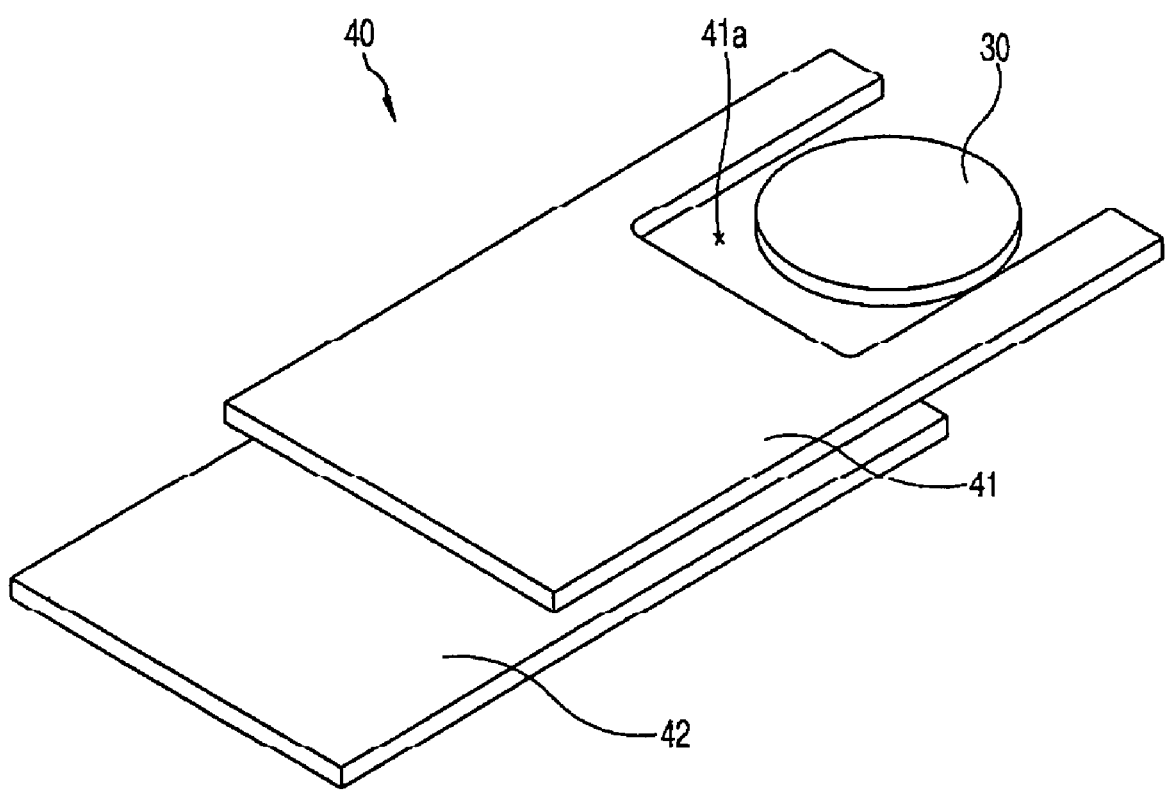
FIG. 5 is a perspective view of a slide module and the speaker according to one embodiment of the present invention.

As illustrated in FIGS. 4 and 5, a slide module 40 includes a first slide member 41 fixed to a lower surface of the first body 10, a second slide member 42 fixed to an upper surface of the second body 20 and a connection member 43 for slidably connecting the first slide member 41 to the second slide member 42. An insertion hole 41a for inserting the speaker 30 in back and forth directions is formed at the first slide member 41.

When a thickness (t1) of the speaker 30 is less than a thickness (t2) of the first slide member 41, the speaker 30 is completely inserted into the first slide member 41. Accordingly, the speaker 30 is prevented from overlapping the rear surface of the display 12, thereby preventing an increase in the thickness of the mobile communication terminal.

When the speaker 30 is installed at the rear surface of the speaker rib 14 or the display 12, sound emitted from the portion of the front surface of the speaker 30 that is exposed to the speaker hole 11 is transmitted to a front side of the first body 10 through the speaker hole 11. At the same time, sound emitted from the rear surface of the speaker 30 is resonated in the first body 10 and the resonated sound is transmitted to a user.

High pitched sound, which corresponds to a man's voice or instrument sound, is emitted from the portion at the front surface of the speaker 30 that is exposed to the speaker hole 11 and transmitted to the user via the speaker hole 11. Low or middle pitched sound is emitted from the rear surface of the speaker 30 and resonated in the first body 10.

With the sound insulator device 31 and the speaker 30 sequentially installed at the rear surface of the display 12, sound emitted from the rear surface of the speaker is shielded by the first sound insulator 32 and sound emitted from an overlapped region between the front surface of the speaker and the display is shielded by the second sound insulator 33. Even if sound is leaked into the gap (g2) between the display 12 and the display guard rib 15, the leaked sound is shielded by the first sound insulator 32, thereby preventing transmission of the leaked sound to the front side of the first body 10 through the speaker hole 11. Since the first sound insulator 32 and the second sound insulator 33 are separated from each other by the gap (g1), a slight motion of the display 12 in the display guard rib 15 due to an external impact is prevented.

Since a speaker 30 formed of a thin and wide disk type material is arranged at the rear surface of the display 12, a speaker suitable for music appreciation can be implemented without widening the mobile communication terminal or decreasing an area of the display. Furthermore, mixture of sound emitted toward the front side of the speaker 30 and sound emitted toward the rear side of the speaker is prevented by the sound leak preventing unit. In a slide-type mobile communication terminal, the speaker 30 is inserted into the insertion hole 41a of the slide module 40, thereby preventing an increase in the thickness of the first body 10 and avoiding any requirement for additional space for mounting components.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
 a terminal body having a speaker hole;
 a display installed in the terminal body;
 a speaker installed at a rear surface of the display such that a portion of the speaker is exposed to the speaker hole, and
 a speaker rib formed between an inner surface of the terminal body and the exposed portion of the speaker and adapted to support the speaker,
 wherein sound emitted toward a front side of the terminal body and sound emitted toward a rear side of the terminal body are prevented from mixing.

2. The mobile communication terminal of claim 1, wherein the speaker is a disk-type speaker.

3. The mobile communication terminal of claim 1, wherein the speaker rib is formed as an arc shape to surround a peripheral portion of the speaker hole.

4. The mobile communication terminal of claim 1, wherein the speaker rib is in contact with a display guard rib adapted to protect the display.

5. The mobile communication terminal of claim 1, wherein a front surface of the speaker is fixed to a rear surface of the speaker rib and a rear surface of the display.

6. The mobile communication terminal of claim 1, wherein the speaker is a piezoelectricity speaker.

7. A mobile communication terminal, comprising:
a terminal body having a speaker hole;
a display installed in the terminal body;
a speaker installed at a rear surface of the display such that a portion of the speaker is exposed to the speaker hole;
a speaker rib formed between an inner surface of the terminal body and the exposed portion of the speaker and adapted to support the speaker; and
a sound leak preventing unit installed at a front surface of the speaker and adapted to prevent sound emitted from the speaker from leaking from the terminal body.

8. The mobile communication terminal of claim 7, wherein the speaker is a disk-type speaker.

9. The mobile communication terminal of claim 7, wherein the speaker is a piezoelectricity speaker.

10. The mobile communication terminal of claim 7, wherein the sound leak preventing unit comprises:
a speaker rib formed between an inner surface of the terminal body and the portion of the speaker exposed to the speaker hole; and
a sound insulator installed between the front surface of the speaker and the speaker rib and display.

11. The mobile communication terminal of claim 10, wherein the speaker rib is formed as an arc shape to surround a peripheral portion of the speaker hole.

12. The mobile communication terminal of claim 10, wherein the speaker rib is in contact with a display guard rib adapted to protect the display.

13. The mobile communication terminal of claim 10, wherein the sound insulator comprises:
a first sound insulator having a band shape of a certain width along an end of the speaker rib and disposed between the speaker rib and the speaker; and
a second sound insulator disposed at an overlapped region between the display and the speaker.

14. The mobile communication terminal of claim 13, wherein the second sound insulator is formed as a plate.

15. The mobile communication terminal of claim 13, wherein a gap between the first sound insulator and the second sound insulator is less than or equal to a gap between the display and a display guard rib adapted to protect the display.

16. The mobile communication terminal of claim 10, wherein a front surface of the speaker is fixed to a rear surface of the speaker rib and a rear surface of the display.

17. A mobile communication terminal, comprising:
a first body having a speaker hole at one side;
a display installed in the first body adjacent the speaker hole;
a second body slidably coupled to the first body;
a slide module disposed between the first body and the second body and adapted to guide the first body relative to the second body; and
a speaker installed at a rear surface of the display in the slide module and having a portion exposed to the speaker hole,
wherein the slide module comprises:
a first slide member fixed to a lower surface of the first body;
a second slide member fixed to an upper surface of the second body; and
a connection member adapted to slidably connect the first slide member to the second slide member,
the first slide member has an insertion hole and the speaker is mounted in the insertion hole, and
sound emitted toward a front side of the speaker and sound emitted toward a rear side of the speaker are prevented from mixing.

18. The mobile communication terminal of claim 17, wherein the speaker is a disk type speaker.

19. The mobile communication terminal of claim 17, wherein the speaker is a piezoelectricity speaker.

20. The mobile communication terminal of claim 17, further comprising a speaker rib formed between an inner surface of the terminal body and the exposed portion of the speaker and adapted to support the speaker.

21. The mobile communication terminal of claim 20, further comprising a sound leak preventing unit installed at a front surface of the speaker and adapted to prevent sound emitted from the speaker from leaking from the first body.

22. The mobile communication terminal of claim 21, wherein the sound leak preventing unit comprises:
a speaker rib formed between an inner surface of the terminal body and the portion of the speaker exposed to the speaker hole; and
a sound insulator installed between a front surface of the speaker and the speaker rib and display.

23. The mobile communication terminal of claim 22, wherein the speaker rib is formed as an arc shape to surround a peripheral portion of the speaker hole.

24. The mobile communication terminal of claim 22, wherein the speaker rib is in contact with a display guard rib adapted to protect the display.

25. The mobile communication terminal of claim 22, wherein a front surface of the speaker is fixed to a rear surface of the speaker rib and a rear surface of the display.

26. The mobile communication terminal of claim 21, wherein the sound insulator comprises:
a first sound insulator having a band shape of a certain width along an end of the speaker rib and disposed between the speaker rib and the speaker; and
a second sound insulator disposed at an overlapped region between the display and the speaker.

27. The mobile communication terminal of claim 26 wherein the second sound insulator is formed as a plate.

28. The mobile communication terminal of claim 26, wherein a gap between the first sound insulator and the second sound insulator is less than or equal to a gap between the display and a display guard rib adapted to protect the display.

* * * * *